(12) United States Patent
Holing et al.

(10) Patent No.: US 10,072,771 B2
(45) Date of Patent: Sep. 11, 2018

(54) SHAPE MEMORY ALLOYS

(71) Applicant: Danfoss A/S, Nordborg (DK)

(72) Inventors: Niels Gregersen Holing, Galten (DK);
Bjarne Frederiksen, Lemming (DK);
Arne Markvart, Silkeborg (DK);
Haraldur Sigurdsson, Risskov (DK);
Gaia Balzarini, Lecco (IT)

(73) Assignee: Danfoss A/S, Nordborg (DK)

(*) Notice: Subject to any disclaimer, the term of this patent is extended or adjusted under 35 U.S.C. 154(b) by 0 days.

(21) Appl. No.: 15/133,505

(22) Filed: Apr. 20, 2016

(65) Prior Publication Data
US 2016/0312911 A1 Oct. 27, 2016

(30) Foreign Application Priority Data
Apr. 23, 2015 (EP) .................................. 15164763

(51) Int. Cl.
| | | |
|---|---|---|
| *F16K 17/38* | (2006.01) | |
| *F16K 31/00* | (2006.01) | |
| *G05D 23/02* | (2006.01) | |
| *F03G 7/06* | (2006.01) | |
| *F24D 19/10* | (2006.01) | |
| *G05D 23/08* | (2006.01) | |

(52) U.S. Cl.
CPC ............ *F16K 31/002* (2013.01); *F03G 7/065* (2013.01); *F24D 19/1018* (2013.01); *G05D 23/025* (2013.01); *G05D 23/026* (2013.01); *G05D 23/08* (2013.01); *F24D 2220/0257* (2013.01); *Y10T 137/7737* (2015.04)

(58) Field of Classification Search
CPC ......... F16K 31/002; F24D 19/018; F24D 3/08; F03G 7/065; G05D 23/026; G05D 23/08; G05D 23/025

USPC ............................................................. 137/468
See application file for complete search history.

(56) References Cited

U.S. PATENT DOCUMENTS

| | | | |
|---|---|---|---|
| 2,123,283 A | | 7/1938 | Kronmiller |
| 2,290,838 A | * | 7/1942 | White .................. G05D 23/123 236/92 R |
| 3,400,906 A | * | 9/1968 | Stocklin ................ F16K 31/025 236/68 R |
| 4,325,217 A | * | 4/1982 | Golestaneh ............. F03G 7/065 116/218 |
| 4,522,219 A | * | 6/1985 | Ohkata ...................... E03B 7/12 116/218 |

(Continued)

FOREIGN PATENT DOCUMENTS

| | | |
|---|---|---|
| CN | 2685679 Y | 3/2005 |
| CN | 101260824 A | 9/2008 |

(Continued)

*Primary Examiner* — Umashankar Venkatesan
(74) *Attorney, Agent, or Firm* — McCormick, Paulding & Huber LLP (57) ABSTRACT

This invention relates to valves (2) for heat exchanger thermostats (1), thermostat heads (3) for a heat exchanger thermostat (1) and a heat exchanger thermostat (1) comprising a valve (2) and a thermostat head (3). According to the invention, temperature sensitive means (10) are provided on or within said valve (2) and/or said thermostat head (3) influencing a throttling behavior of said valve (2) depending on a temperature of a fluid controlled by said valve (2). By this, a premature throttling of the fluid controlled by said valve (2) due to heat transfer between the fluid and the thermostat head (3) may be prevented. Thus, a good ambient temperature may be established which comes closer to the desired room temperature.

22 Claims, 9 Drawing Sheets

(56) References Cited

U.S. PATENT DOCUMENTS

| | | | | |
|---|---|---|---|---|
| 4,984,542 | A * | 1/1991 | Rische | F03G 7/065 123/179.18 |
| 6,427,712 | B1 * | 8/2002 | Ashurst | E03B 7/10 137/2 |
| 7,086,602 | B2 * | 8/2006 | Yang | F16K 31/002 236/12.2 |
| 7,377,286 | B2 * | 5/2008 | King, Jr. | E03B 7/12 137/1 |
| 7,971,601 | B2 * | 7/2011 | Lum | F16K 31/002 137/337 |
| 8,141,790 | B2 * | 3/2012 | Sheppard | F01P 7/16 236/100 |
| 8,327,867 | B2 * | 12/2012 | Caleffi | E03B 7/12 137/62 |
| 8,434,510 | B2 * | 5/2013 | Lum | F16K 31/002 137/337 |
| 9,151,497 | B2 * | 10/2015 | Happe | F23N 1/007 |
| 9,170,584 | B2 * | 10/2015 | Lum | F16K 31/002 |
| 9,581,144 | B2 * | 2/2017 | Sohn | F03G 7/065 |

FOREIGN PATENT DOCUMENTS

| | | | |
|---|---|---|---|
| CN | 101784974 | A | 7/2010 |
| DE | 33 45 511 | A1 | 7/1985 |
| DE | 41 33 942 | A1 | 4/1993 |
| DE | 10 2008 018 639 | A1 | 10/2009 |
| DE | 10 2008 063 534 | A1 | 7/2010 |
| EP | 0 027 933 | A1 | 5/1981 |
| RU | 2359163 | C2 | 6/2009 |
| WO | 2009124766 | A2 | 10/2009 |

* cited by examiner

Fig.9

SHAPE MEMORY ALLOYS

CROSS REFERENCE TO RELATED APPLICATION

Applicant hereby claims foreign priority benefits under U.S.C. § 119 from European Patent Application No. EP15164763 filed on Apr. 23, 2015, the content of which is incorporated by reference herein.

TECHNICAL FIELD

The invention relates to a valve for a heat exchanger thermostat, the valve comprising an inlet, an outlet, a valve seat between said inlet and said outlet, and a valve element cooperating with said valve seat and being actuable by a valve rod.

Furthermore the invention relates to a thermostat head for a heat exchanger thermostat, the thermostat head comprising temperature depending actuating means for actuating a valve depending on an ambient temperature of the thermostat head.

In addition the invention relates to a heat exchanger thermostat comprising a valve and a thermostat head, the valve comprising an inlet, an outlet, valve seat between said inlet and said outlet, and a valve element cooperating with said valve seat and being actuable by a valve rod, and the thermostat head comprising temperature depending actuating means for actuating a valve depending on an ambient temperature of the thermostat head.

BACKGROUND

DE 33 45 511 C2 discloses an apparatus for limiting a convective heat transfer to a thermostat head from a fluid passing through a valve. In order to limit the convective heat transfer between the valve and the thermostat head an annular disc is provided between the valve and the thermostat head which deflects heated air away from the thermostat head.

From U.S. Pat. No. 6,427,712 B1 an actuator for controlling an anti-freeze plug for draining a condensate collector pan through a drain hole when the ambient temperature approaches freezing is known. A shape memory alloy (SMA) actuator which responds to changes in ambient temperature in which a coiled SMA spring is provided is disclosed.

DE 10 2008 018 639 A1 teaches a thermostatic regulation device in which an actuating member depending on an ambient temperature is formed of a shape memory alloy. This element replaces a bellows usually present for actuating a valve element depending on the ambient temperature of a thermostat head.

DE 10 2008 063 534 A1 teaches a spring element formed of a shape memory alloy which depends on a temperature of an electrically controlled heating element.

It is a known problem in heat exchanger thermostats that temperature depending actuating means for actuating a valve depending on an ambient temperature of the thermostat head are influenced by a temperature of a fluid controlled by said valve. Thus, the temperature depending actuating means may actuate the valve to reduce a fluid flow before the desired ambient temperature is actually reached. Because of that the temperature of, for example, a room may be inadequately low.

SUMMARY

An object of the present invention lies in providing a heat exchanger thermostat comprising a valve and a thermostat head, as well as a valve and a thermostat head that allow for a good temperature control of the ambient temperature.

The object of the invention is solved by a valve for a heat exchanger thermostat, the valve comprising an inlet, an outlet, a valve seat between said inlet and said outlet, and a valve element cooperating with said valve seat and being actuable by a valve rod, characterized in that temperature sensitive means are provided on or within said valve influencing a throttling behavior of said valve depending on a temperature of a fluid controlled by said valve.

Furthermore, a solution is provided by a thermostat head for a heat exchanger thermostat, the thermostat head comprising temperature depending actuating means for actuating a valve depending on an ambient temperature of the thermostat head, characterized in that temperature sensitive means are provided on or within said thermostat head influencing a throttling behavior of said valve depending on a temperature of a fluid being controlled by said valve.

Additionally, the object of the invention is solved by a heat exchanger thermostat comprising a valve and a thermostat head, the valve comprising an inlet, an outlet, a valve seat between said inlet and said outlet, and a valve element cooperating with said valve seat and being actuable by a valve rod, and the thermostat head comprising temperature depending actuating means for actuating a valve depending on an ambient temperature of the thermostat head, characterized in that temperature sensitive means are provided on or within said valve and/or said thermostat head influencing a throttling behavior of said valve depending on a temperature of a fluid controlled by said valve.

When temperature sensitive means are provided on or within said valve and/or said thermostat head respectively, influencing the throttling behavior of said valve depending on the temperature of the fluid controlled by said valve, an adequate control of the ambient temperature is possible. For example, the temperature sensitive means may be configured to influence an effective length of the valve element depending on the temperature of the fluid or the temperature sensitive means may be configured to influence a force actuating the valve element depending on the temperature of the fluid. This means, that the present invention allows to influence the throttling behavior of the valve which may be distorted by a thermal transfer between the fluid controlled by said valve and temperature depending actuating means for actuating the valve.

Such a correction is provided accordingly by a temperature sensitive means depending on the temperature of the fluid controlled by said valve. The fluid flow within the valve by this may be kept at a higher level for an extended time despite the temperature depending actuating means for actuating the valve depending on the ambient temperature of the thermostat head being affected by elevated temperatures of the fluid controlled by said valve due to unwanted thermal transfer compared to conventional setups where no such temperature sensitive means are present. Thus, as the ambient temperature can still be increased although the temperature depending actuating means already act to decrease the amount of fluid flowing through said valve, a good ambient temperature as desired may be established.

It shall be understood that in the sense of this invention the temperature sensitive means depend predominantly on a temperature of a fluid controlled by said valve, the temperature of the fluid preferably transferring at least 50% of the total temperature transferred to the temperature sensitive means. That means that ambient temperature or other temperature sources, for example an electric temperature source present in the valve, only have a minor influence on the temperature sensitive means. Preferably the temperature sensitive means depend on a temperature of fluid controlled by said valve by more than 75%, more than 90%, most preferably more than 99%. In the latter case the temperature sensitive means would preferably be well shielded within the valve from most temperature sources other than the fluid controlled by said valve.

It is preferred that the temperature sensitive means are configured to influence the effective length of the valve element depending on the temperature of the fluid. This has the effect that while the temperature depending actuating means for actuating the valve depending on the ambient temperature of the thermostat head already throttle the fluid in order to decrease the flow within the valve, an increased flow may be maintained over an extended period of time. For example, the effective length of the valve element may be reduced when crossing a certain temperature of the fluid. Preferably, below that certain temperature of the fluid the valve element has a larger effective length than above that certain temperature of the fluid. This may be advantageous, as relatively hot fluid may distort the temperature depending actuating means more easily due to increased heat transfer compared to relatively cool fluid. So, in case the temperature sensitive means are configured to influence the effective length of the valve element depending on the temperature of that fluid, the thermal effect of the fluid on the temperature depending actuating means may be compensated advantageously.

In a preferred embodiment the temperature sensitive means are arranged within the valve element. In such a case, it is preferred that the valve element comprises at least two separate parts. The temperature sensitive means may then set a distance between said separate parts depending on the temperature of the fluid controlled by said valve. For example, the valve element may comprise a first throttling part and a second throttling part, the first throttling part being connected to a valve rod and interposing the valve rod and the second throttling part. Then it is preferred, that the temperature sensitive means is interposed between the first throttling part and the second throttling part of the valve element. In one embodiment, the temperature sensitive means are surrounded by a rubber element being located within the valve element in order to stretch the rubber element depending on the temperature of the fluid. Preferably, the temperature sensitive means reduces an extension of the valve element along an axis of the valve rod when a certain temperature of the fluid is surpassed. By that the effective length of the valve element may be advantageously influenced.

It is preferred that the temperature sensitive means are interposed between the valve element and the valve rod. Thus, preferably, the valve element and the valve rod are separate parts. Then, the temperature sensitive means may be interposed in order to set a distance between the valve element and the valve rod depending on the temperature of the fluid controlled by said valve. Thus, for example, if the fluid controlled by said valve surpasses a certain temperature, a distance between the valve element and the valve rod may be decreased. The relatively high temperature of the fluid may affect the temperature depending actuating means to decrease the fluid flow in the valve, but as in turn the effective length of the valve element is decreased, the actual flow of the fluid can be maintained at a higher level for an extended period of time.

Preferably, the temperature sensitive means are arranged on the valve seat. In that case the temperature sensitive means may provide for an increased fluid flow through the valve even if the temperature depending actuating means, being distorted by the temperature of the fluid controlled by said valve, already actuate the valve to decrease the fluid flow. For example, the temperature sensitive means may increase a cross section within the valve when a certain temperature is surpassed. In another embodiment the sensitive means may hinder the valve element from decreasing the fluid flow through the valve when the fluid temperature surpasses a certain value, so that the temperature sensitive means mechanically hinders the actuation of the valve element beyond a certain effective length. By this, the fluid flow through the valve may be kept at an increased level even at elevated fluid temperatures. For example, the temperature sensitive means may hinder a translation of the valve element above a certain fluid temperature.

In a preferred embodiment of the invention the temperature sensitive means are configured to influence a force actuating the valve element depending on the temperature of the fluid. By this a force balance between the temperature sensitive means and the temperature depending actuating means may be established that allows for keeping an increased fluid flow through the valve although the temperature depending actuating means, being distorted by the fluid temperature, impose a relatively large force for decreasing the flow through the valve. Preferably, the force provided above a certain fluid temperature is 3-10 N larger than the force provided below that temperature. Preferably the force increases above 40° C., more preferably above 55° C. Preferably the force keeps constant above 65° C., more preferably 70° C., most preferably above 75° C.

In a preferred embodiment the temperature sensitive means are interposed between a resilient resetting means for the valve element and a resetting means seat. A resilient resetting means preferably is a type of spring, most preferably a coil spring. It is preferred that the resetting means coaxially surrounds the valve rod. When the temperature sensitive means are imposed between the resilient resetting means for the valve element and the resetting means seat, the temperature sensitive means may, above a certain temperature of the fluid, increase a resetting force created by said resetting means opposing the actuating force applied by the temperature depending actuating means. Thus, a force balance is created or influenced that prevents a decrease of the fluid flow inside the valve before the desired ambient temperature is actually reached.

It is preferred that the temperature sensitive means form a resilient resetting means for the valve element. Such a solution may be a very convenient way of implementing the temperature sensitive means within the valve. The temperature sensitive means may preferably replace a resilient resetting means made from a non-temperature sensitive material. In some embodiments the temperature sensitive means are used in addition to a resilient resetting means made from a non-temperature sensitive material. Thus, for example, two coil springs may be present. Then, preferably, one is made from temperature sensitive material while the other is made from non-temperature sensitive material. At elevated temperatures of the fluid controlled by said valve, the temperature sensitive means may provide an increased resetting force opposing the force created by the temperature depending for actuating means for actuating the valve. Thus, an increased flow of fluid controlled by said valve may be maintained over an extended period of time.

In a preferred embodiment of the invention the temperature sensitive means comprise a shape memory alloy and/or a bi-metal. In an even more preferred embodiment the temperature sensitive means consist of a shape memory alloy. In another embodiment the temperature sensitive means consist of a bi-metal. Such materials may be most useful to design the temperature sensitive means in order to allow an influence on the throttling behavior of said valve depending on the temperature of the fluid controlled by said valve. In a preferred embodiment a shape memory alloy is a TiNi-alloy, an alloy based on Cu-basis, Fe-basis or similar or on a memory plastic. The bi-metal materials may be taken from any known bi-metal combination.

It is preferred that the temperature sensitive means comprise a distancing disc and/or a coil spring. Such distancing discs or coil springs may be easily produced from preferred materials such as shape memory alloys or bi-metals. Furthermore they may allow for a compact build of the valve or the heat exchanger thermostat as a whole. It is preferred that the temperature sensitive means is a compression spring. Most preferably, the temperature sensitive means is a compression spring formed of shape memory alloy.

It is preferred that the temperature sensitive means provide a first force at a first temperature and a second force at a second temperature, the first force being lower than the second force and the first temperature being lower than the second temperature. For example, at a relatively low temperature of the fluid controlled by said valve the temperature sensitive means provides a rather low first force. Then, when the fluid controlled by said valve reaches a relatively high temperature, the temperature sensitive means is adapted to provide a relatively high second force. This has the advantage that when the fluid has a high temperature and there is a high risk of distorting the temperature depending actuating means by the temperature of the fluid controlled by said valve, the temperature sensitive means can provide a relatively high second force opposing the actuating force created by the temperature depending actuating means. By that, the throttling behavior of said valve may be influenced in order to maintain a relatively high fluid flow through the valve even when the temperature depending actuating means provide an increased actuating force for decreasing the flow through the valve. By that a good tempering of the ambient temperature may be reached. For example, the temperature sensitive means may provide a first force of 20 N when the fluid controlled by said valve has a temperature of 50° C. Preferably the temperature sensitive means may provide a second force of 27 N when the temperature of the fluid controlled by said valve is at 70° C. In some embodiments the second force may remain constant at a fluid temperature above 70° C., preferably, above 72° C., most preferably above 75° C. In other embodiments the second force may even decrease at temperatures above 70° C., for example 72° C. It may for example decrease to the force provided by the first force. Advantageously this delta in force will press a thermostat spindle away from the valve. Thus, the valve element will close the valve at a later time, so that an increased ambient temperature may be reached beforehand. The first force and the second force preferably are resetting forces opposing the actuating force. The forces also may be distancing forces for setting a distance between elements of the valve or the thermostat head, for example between parts of the valve element or between the valve element and the valve rod.

In some embodiments the temperature sensitive means have no influence on the force actuating the valve element below a lower boundary fluid temperature. Thus, up to the lower boundary fluid temperature the temperature sensitive means preferably provide no force opposing the actuating force, said opposing force being preferably the resetting force. Preferably in a fluid temperature range between the lower boundary fluid temperature and an upper boundary fluid temperature, the temperature sensitive means provide the force opposing the actuating force, thus counteracting the actuation of the valve element. It is preferred that above the upper boundary fluid temperature the temperature sensitive means provide no force opposing the actuating force. Preferably the lower boundary fluid temperature is smaller than 70° C., more preferably smaller than 60° C., more preferably smaller than 55° C., more preferably smaller than 50° C., more preferably smaller than 45° C. and even more preferably smaller than 40° C. On the other hand, the lower boundary fluid temperature is preferably larger than 35° C., preferably larger than 45° C., preferably larger than 55° C., preferably larger than 65° C. Preferably the upper boundary fluid temperature is smaller than 100° C., more preferably smaller than 90° C., more preferably smaller than 80, more preferably smaller than 70° C., and most preferably smaller than 60° C. Preferably the upper boundary fluid temperature is larger than 55° C., preferably larger than 65° C., preferably larger than 75° C., preferably larger than 85° C. and preferably larger than 95° C. Preferred lower boundary fluid temperatures are 52° C. or 55° C. Preferred upper boundary fluid temperatures are 68° C., 70° C. or 72° C. It is preferred that a change in the opposing force occurs between the lower boundary fluid temperature and the upper boundary fluid temperature. Preferably the opposing force is constant below and up to the lower boundary fluid temperature. Preferably the opposing force is constant starting from and above the upper boundary fluid temperature. It is most preferred that there is no change of force below 52° C. and above 72° C. There may be a hysteresis concerning the lower boundary fluid temperature and the upper boundary fluid temperature so that at least one of those temperatures varies from a phase of increasing fluid temperature to a phase of decreasing fluid temperature. Preferably the hysteresis is less or equal plus/minus 5° C. for one of the boundary fluid temperatures, preferably for both of them. It is preferred that the lower boundary fluid temperature is the first temperature. It is preferred that the upper boundary fluid temperature is the second temperature. Preferably the change in force is 5 to 10 N.

In a preferred embodiment the temperature sensitive means provide a first force in a first temperature range and a second force different from the first force in a second temperature range, a transition from the first force to the second force occurring at the temperature of the fluid of between 40° C. and 90° C. As stated before, an increased fluid temperature also increases the risk of distorting the effect of ambient temperature on the temperature depending actuating means for actuating the valve. Thus, it is an advantage to increase an influencing force of the temperature sensitive means when there is an increased risk of having an increased actuating force provided by the temperature depending actuating means based on the temperature of the fluid controlled by said valve. Preferably the transition occurs at a temperature higher than 45° C., preferably at a temperature higher than 50° C., preferably higher than 60° C., and preferably higher than 70° C. It is preferred that the transition occurs at a temperature lower than 50° C., preferably lower than 60° C., preferably lower than 80° C., and preferably lower than 85° C. In a most preferred embodiment of the invention, the transition from the first force to the second force occurs at 55° C. It is preferred that the first force is smaller than the second force. The first force may be larger than the second force though, for example when the effective length of the valve element should be reduced at higher temperatures. Then a smaller second force may set reduced distances between elements. Again, the force may for example be a resetting force or a distancing force.

It should be understood that temperature sensitive means as described above may as well be present, mutatis mutandis, in or on the thermostat head for the heat exchanger thermostat. Thus, the preferred embodiments of the temperature sensitive means in the valve described above may also apply to temperature sensitive means present in or on the thermostat head for the heat exchanger thermostat.

In a preferred embodiment of the heat exchanger thermostat the valve and the thermostat head form an integrated unit. That means that the valve and the thermostat head may not be separated by a user. For example, the valve and the thermostat head are connected via a unitary valve rod that prevents detachment of the thermostat head from the valve.

It is preferred that in the heat exchanger thermostat the temperature sensitive means are provided within both said valve and said thermostat head influencing a throttling behavior of said valve depending on a temperature of a fluid controlled by said valve. When there are temperature sensitive means both in the valve and the thermostat head respective means of the heat exchanger thermostat may each be designed to provide a reduced force while the total force of all of the temperature sensitive means remains constant. By this, production of a heat exchanger thermostat may become more easy.

BRIEF DESCRIPTION OF THE DRAWINGS

In the following the invention is described in view of preferred embodiments shown in the FIGS. attached, in which:

FIG. 2a and

FIG. 3a and

FIG. 4a and

FIG. 5a and

FIG. 6a and

DETAILED DESCRIPTION

Reference signs are introduced in the following detailed description of preferred embodiments of the invention in order to improve readability of the attached claims. The reference signs are in no way meant to be limiting. Furthermore it should be understood that the described preferred embodiments are merely given by way of example. Thus, the invention is not meant to be limited by the depicted and described embodiments.

Figure 1:
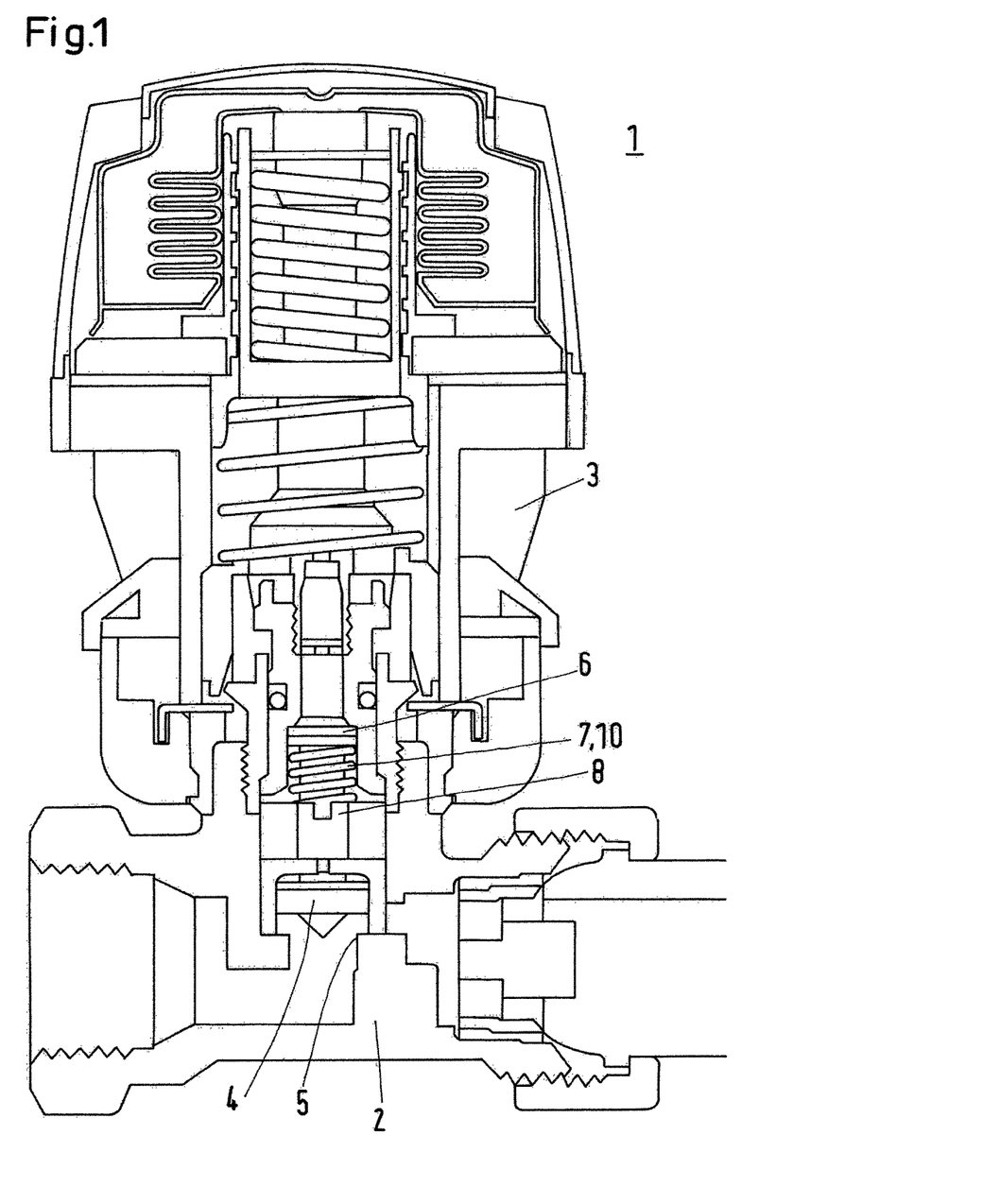
FIG. 1 shows a heat exchanger thermostat, a valve and a thermostat head according to a first embodiment of the invention.

FIG. 1 shows a first embodiment of the invention. A heat exchanger thermostat 1 is depicted. In this embodiment the heat exchanger thermostat 1 is a radiator thermostat. The heat exchanger thermostat 1 comprises a valve 2 and a thermostat head 3. The valve 2 comprises an inlet and an outlet. The valve may be throttled by actuating a valve element 4 which cooperates with a valve seat 5 between said inlet and said outlet. The valve element 4 is actuable by a valve rod 6. A resilient resetting means 7 for the valve element 4 is present. It is situated on a resetting means seat 8. The resetting means seat 8 in this case is located in the valve 2 towards an end of the valve rod 6 to which the valve element 4 is attached.

The thermostat head 3 comprises a temperature depending actuating means 9 for actuating the valve 2 depending on an ambient temperature of the thermostat head 3. A known issue in such a heat exchanger thermostat 1 is that a temperature of a fluid passing from said inlet to said outlet through the valve 2 may transfer to the temperature depending actuating means 9 in the thermostat head. The temperature depending actuating means 9 expand with rising temperature and are meant to depend on an ambient temperature of the thermostat head 3. By that expansion the valve rod 6 is actuated and the valve element 4 is translated within the valve 2 towards the valve seat 5 in order to decrease the fluid flow through the valve 2. Thus, when the temperature of the fluid is transferred to the temperature depending actuating means 9 a measurement of the ambient temperature is distorted and the valve 2 is throttled down before the ambient temperature actually reaches a desired value set via the thermostat head 3.

To overcome this issue, according to the invention the heat exchanger thermostat 1 has temperature sensitive means 10 which are provided within said valve 2 influencing a throttling behavior of said valve 2 depending on the temperature of the fluid controlled by said valve 2. By this, a premature throttling of the valve 2 before the desired ambient temperature is reached can be prevented. Thus, a good ambient temperature is achieved.

In the embodiment as depicted in FIG. 1 the temperature sensitive means 10 are configured to influence a force actuating the valve element 4 depending on the temperature of the fluid. The temperature depending actuating means 9 present in the heat exchanger thermostat head 3 provides a force actuating the valve element 4 depending on the ambient temperature. When the fluid passing through the valve 2 surpasses a certain temperature the temperature sensitive means 10 provide a counterforce opposite to the force being provided by the temperature dependent actuating means 9 actuating the valve element 4, the counterforce depending on the temperature of the fluid. That means, that while the temperature depending actuating means 9 for actuating the valve 2 are distorted by the temperature of the high temperature fluid, thus prematurely reducing the flow through the valve 2, the temperature sensitive means 10 provide a counterforce depending on the temperature of the fluid in order to maintain a less decreased, stable or even increased flow over an extended period of time compared to conventional setups where no temperature sensitive means are provided.

Specifically, in this first embodiment the temperature sensitive means 10 form the resilient resetting means 7 for the valve element 4. Thus, such an embodiment of the invention can easily be provided by replacing non-temperature sensitive resetting means 7 with resetting means 7 which are temperature sensitive. In the given case the resilient resetting means 7 consist basically of a shape memory alloy being provided by the temperature depending actuating means 9. The resilient resetting means 7 will provide a first resetting force of 20 N at 50° C. fluid temperature. The resilient resetting means 7 will give a second resetting force of 27 N at 70° C. fluid temperature. The force difference of 7 N opposes the actuating force provided by the temperature depending actuating means 9 in the thermostat head 3. Thus, a premature decrease of fluid flow through the valve 2 is prevented.

Figure 9:
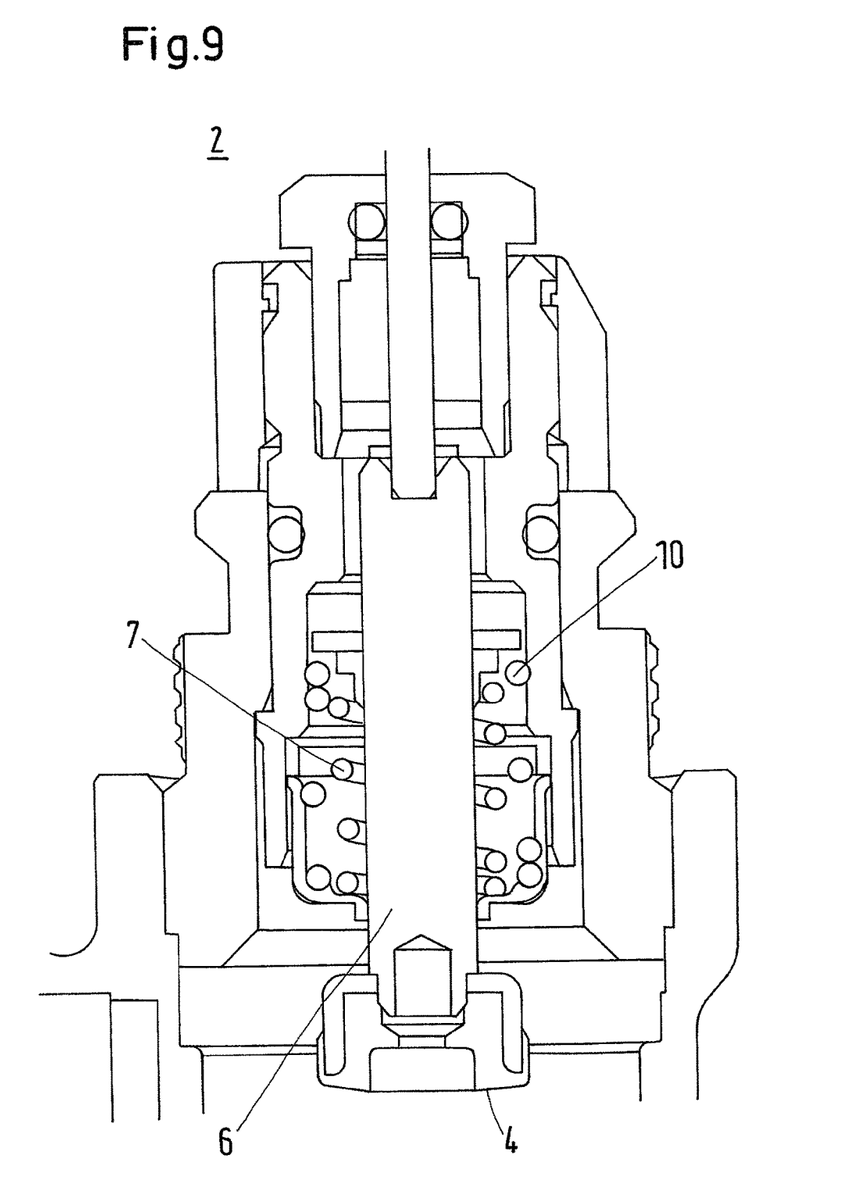
FIG. 9 shows an embodiment of the invention where a SMA spring is combined with a resilient resetting means.

FIG. 9 shows an embodiment where a resilient resetting means 7 and a temperature sensitive means 10 are used jointly, both being embodied as coil springs. The temperature sensitive means 10 are made from a shape memory alloy again and in this embodiment are arranged coaxially around the resilient resetting means 7. The resilient resetting means 7 is made from copper. The temperature sensitive means becomes active above 55° C. and provides a force which is by 3-10 N larger than the force below 55° C. Above 72° C. the force provided by the temperature sensitive means 10 remains constant. Thus, supporting the resilient resetting means 7 above 55° C., the SMA spring provides an increased resetting force opposing the actuating force provided by the temperature depending actuating means 9 (only shown in the illustration of FIGS. 6a and 6b), in the thermostat head.

Figure 6A:
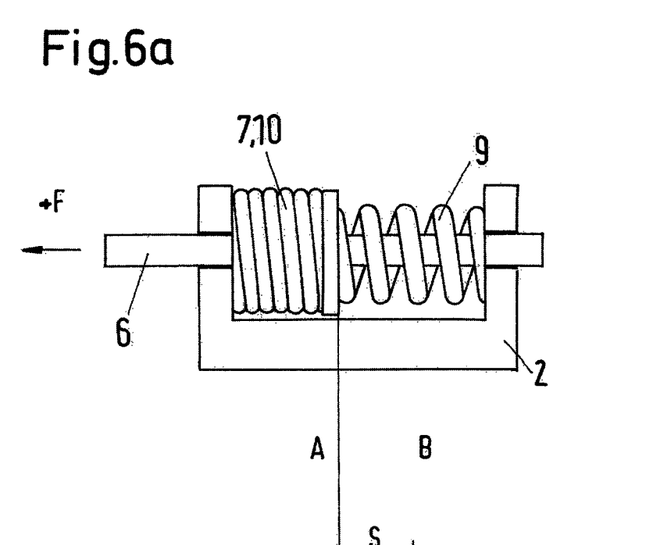
Figure 6B:
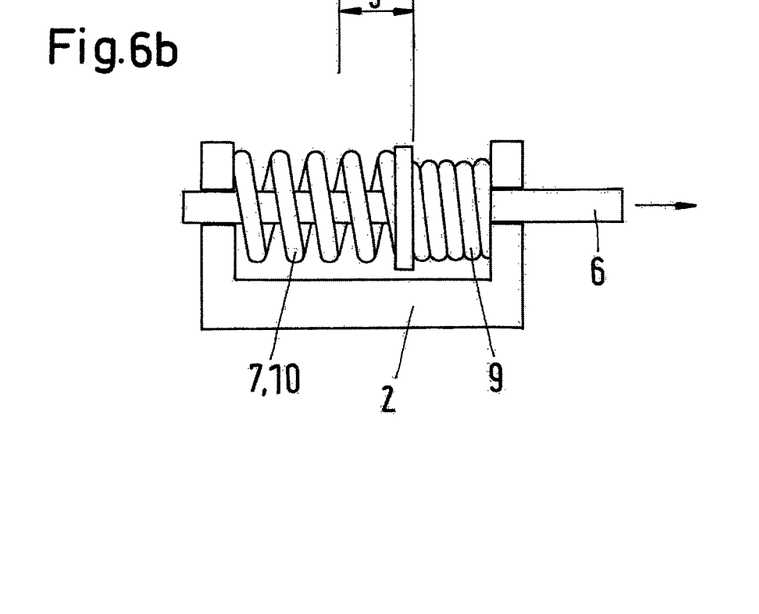
FIG. 6b show an illustration of a force balance in embodiments of the invention.

A simplified illustration of the effect used in the embodiment according to FIGS. 1 and 9 is depicted in FIGS. 6a and 6b, wherein FIG. 6a shows a situation at a state where the fluid temperature is relatively low, for example below 55° C. FIG. 6b shows a situation of a state in which the fluid temperature is higher than in FIG. 6a, for example above 55° C. At relatively low fluid temperatures, the risk of having a heat transfer between the fluid and the temperature depending actuating means 9 is relatively low. Thus, the resilient resetting means 7 formed of a shape memory alloy are designed to provide a first resetting force which is comparably small. By that, the actuating force provided by the temperature depending actuating means 9 can relatively unhindered actuate the valve element 3 as it is expected that the temperature detection of the ambient temperature is not significantly distorted by the temperature of the fluid at such rather low fluid temperatures.

When the temperature of the fluid increases above 55° C., the shape memory alloy is configured to provide a second resetting force which is higher than the first resetting force. As may be seen in FIG. 6b this second resetting force counteracts the actuating force provided by the temperature depending actuating means 9 as it is probable that the comparably high temperature of the fluid will have distorted the temperature detection by the temperature depending actuating means 9. Thus, the valve 2 is kept open for an extended period of time so that the ambient temperature may further rise up to the desired temperature by having the valve element 4 translated by a distance S opposite to the actuating force +F.

Figure 5A:
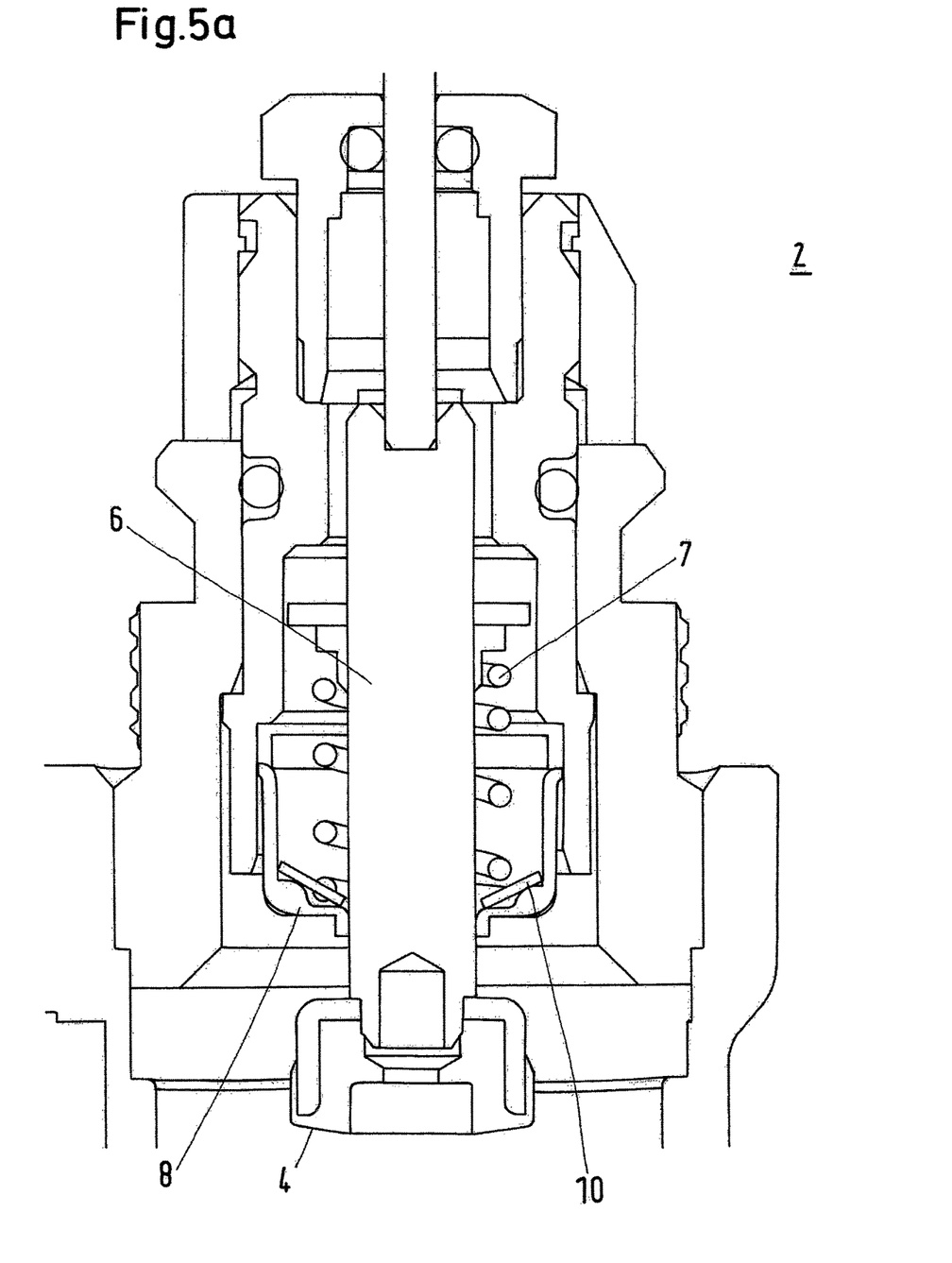
Figure 5B:
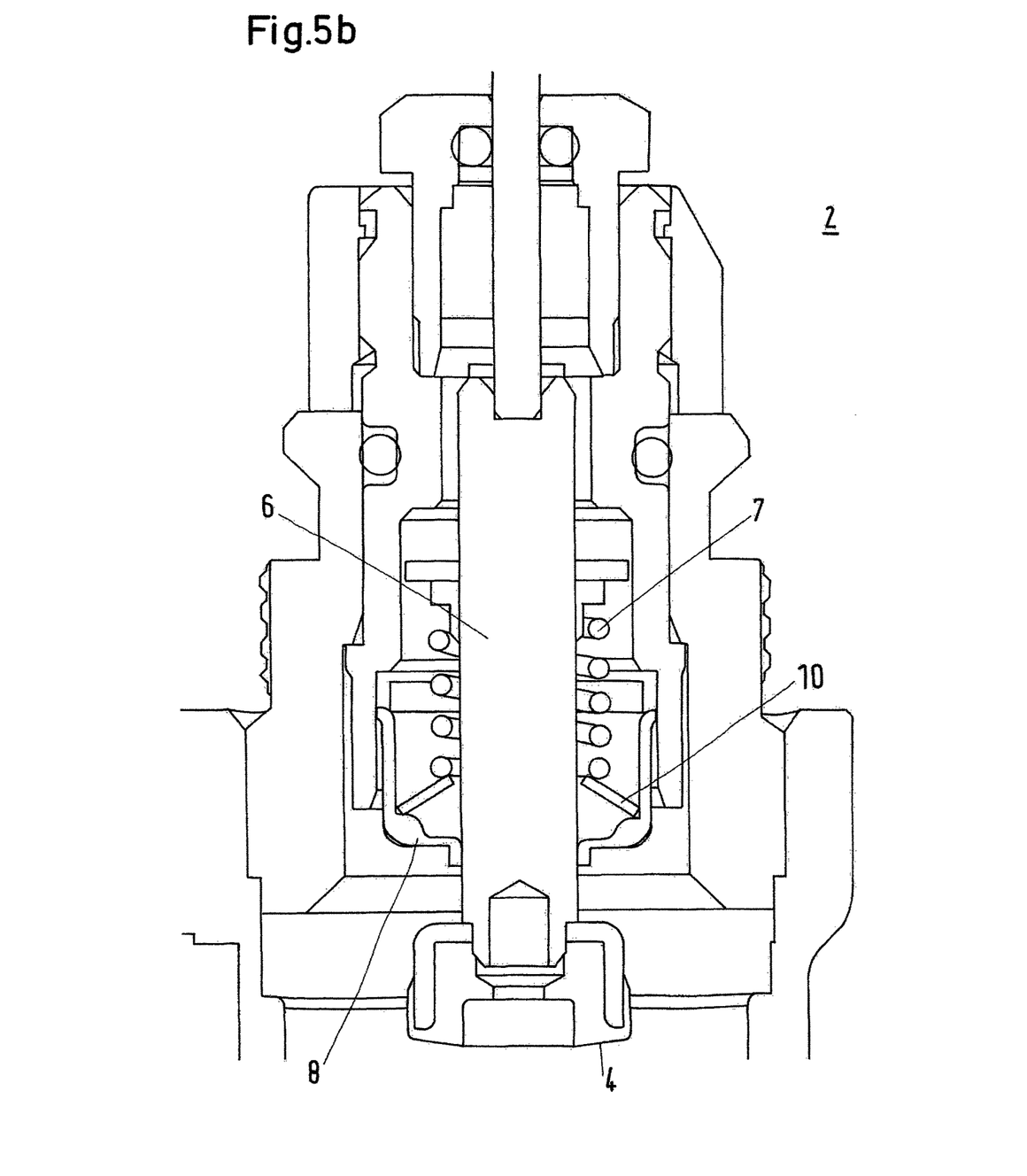
FIG. 5b show a valve according to a fifth embodiment of the invention.

In another embodiment of the invention the resilient resetting means 7 is formed of a material which is not temperature sensitive. In such an embodiment temperature sensitive means 10 are interposed between the resilient resetting means 7 and a resetting means seat 8, as is shown in FIGS. 5a and 5b. While in the embodiment shown in FIGS. 1 and 9 the temperature sensitive means 10 are a coil spring, in the embodiments shown in FIGS. 5a and 5b the temperature sensitive means 10 are a distancing disc as illustrated in FIG. 7.

Figure 7:
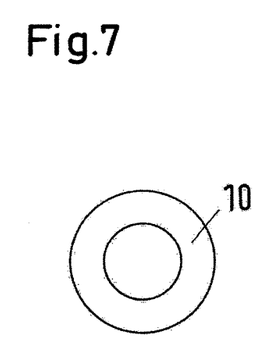
FIG. 7 shows an exemplary embodiment of a temperature sensitive means according to a preferred embodiment of the invention.

FIG. 7 shows the distancing disc in a viewing direction along the valve rod 6. In FIGS. 5a and 5b the distancing disc is arranged coaxially around the valve rod 6. The distancing disc is seated on the resetting means seat 8. The resilient resetting means 7 for the valve element 4 is seated on the temperature sensitive means 10. The temperature sensitive means 10 in this case is formed from a bi-metal. Depending on the temperature of the fluid passing through the valve 2 the distancing disc changes its shape. As can be seen when comparing FIGS. 5a and 5b, the temperature sensitive means 10 thus compress the resetting means 7 when the fluid passing through the valve surpasses a certain temperature which may be between 40° C. and 90° C. By compressing the resilient resetting means 7 a counterforce opposing the actuating force provided by the temperature depending actuating means 9, the actuating force depending on the ambient temperature whose measurement is distorted by the temperature of the fluid, is increased. Thus, a premature downthrottling of the valve 2 is prevented so that the desired ambient temperature may be reached.

Figure 2A:
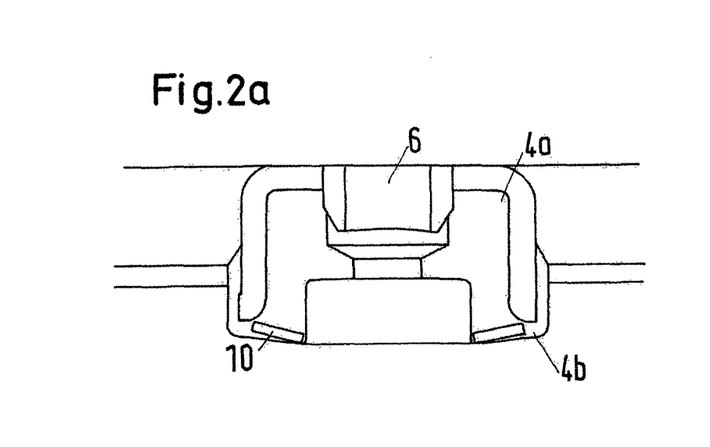
Figure 2B:
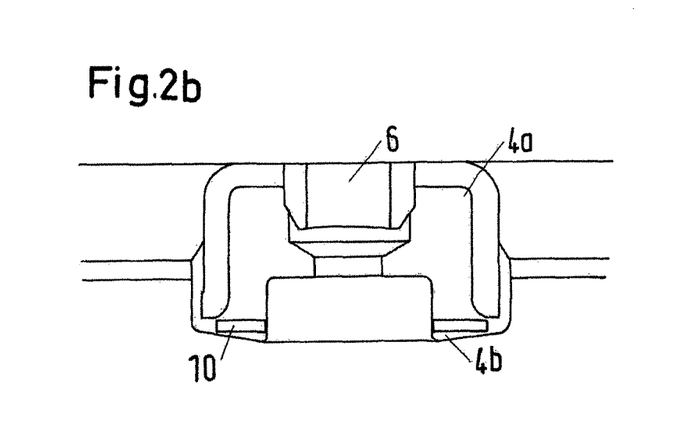
FIG. 2b show a valve element in a valve according to a second embodiment of the invention.

Another embodiment of the invention has temperature sensitive means 10 which are configured to influence an effective length of the valve element 4 depending on the temperature of the fluid. Such solutions are exemplarily shown in FIGS. 2, 3 and 4. As can be seen in FIGS. 2a and 2b temperature sensitive means 10 are arranged within the valve element 4. In this case the valve element 4 has a first throttling part 4a and a second throttling part 4b. The temperature sensitive means 10 are interposed between the first throttling part 4a and the second throttling part 4b. At a relatively low fluid temperature, in this case for example 50° C., the effective length of the valve element 4 is rather long. The temperature sensitive means 10, which in this case again are provided as a distancing disc made of bi-metal, set a first distance between the first throttling part 4a and the second throttling part 4b. At elevated fluid temperatures, for example above 55° C., the temperature sensitive means 10 set a second distance between the first throttling part 4a and the second throttling part 4b. The second distance is smaller than the first distance. Thus, the effective length of the valve element 4 is relatively short above 55° C. compared to a temperature of the fluid below 55° C. This has the effect that a premature throttling of the valve is prevented in case the elevated temperature of the fluid distorts the temperature detection of the temperature depending actuating means 9 in the thermostat head 3. For example, the first distance is by 0.3 mm larger than the second distance.

Figure 3A:
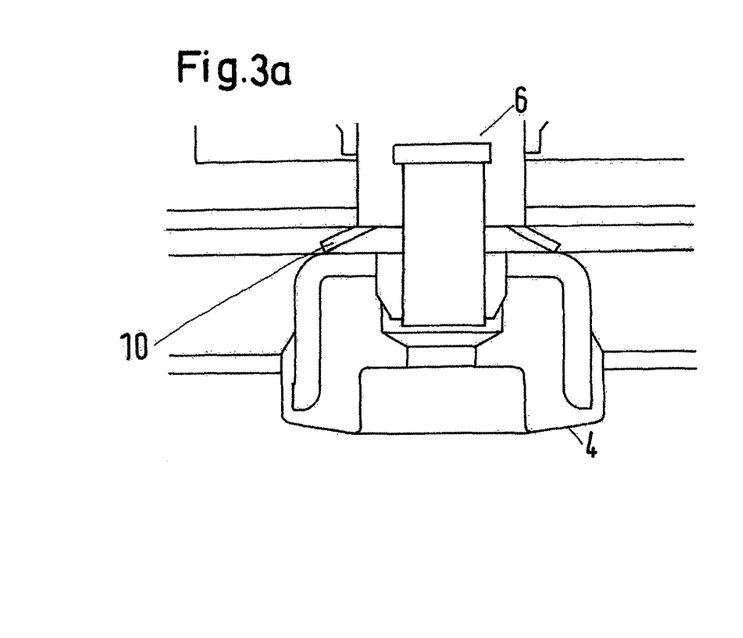
Figure 3B:
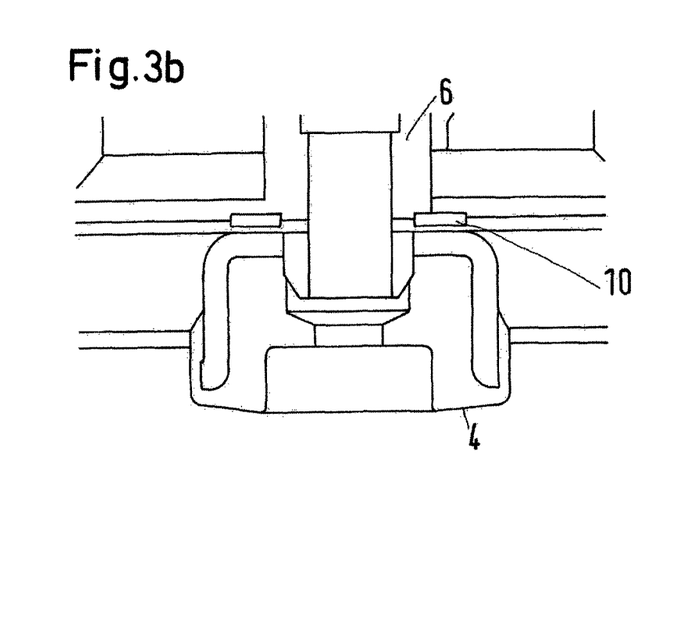
FIG. 3b show a valve element of a valve according to a third embodiment of the invention.

An alternative solution according to the invention based on the same idea is shown in FIGS. 3a and 3b. In FIG. 3a, which depicts the situation in which the fluid temperature is rather low, for example below 55° C., a first distance is set between the valve element 4 and the valve rod 6, as the temperature sensitive means is interposed between the valve element 4 and the valve rod 6. As shown in FIG. 3b, which depicted the situation where the temperature of the fluid flowing through said valve is higher than e.g. 55° C., the temperature sensitive means 10 provide a second distance instead of the first distance, wherein in this exemplary case the second distance is 0.3 mm less than the first distance. Again, the effective length of the valve element 4 is influenced depending on the temperature of the fluid. More specifically, the effective length of the valve element is reduced when the temperature of the fluid passing through said valve 2 surpasses a certain temperature. Thus again, a premature downthrottling of the valve 2 may be prevented, in this case by having the valve element 4 translatably mounted on the valve rod 6, the valve element 4 being actuable by the temperature sensitive means 10.

Figure 4A:
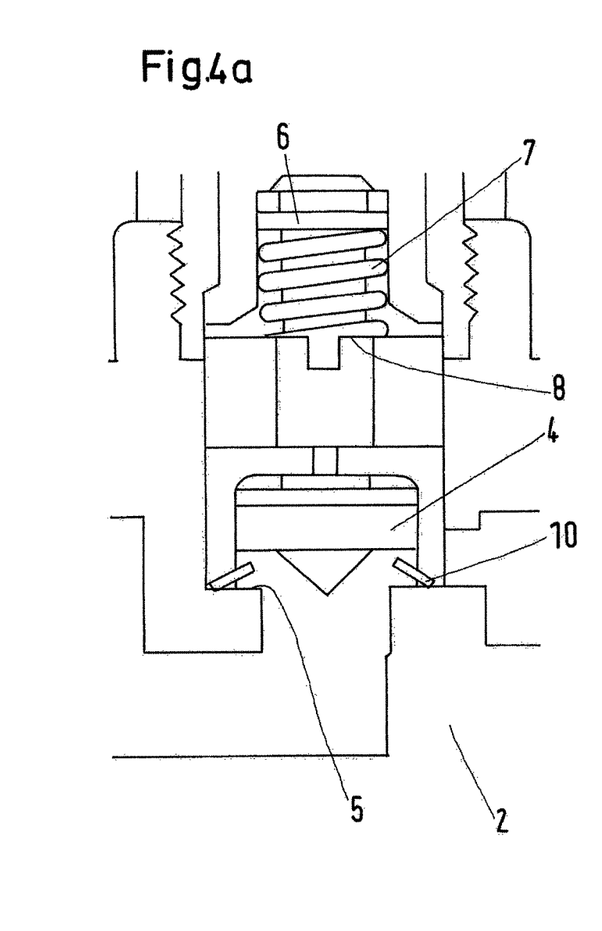
Figure 4B:
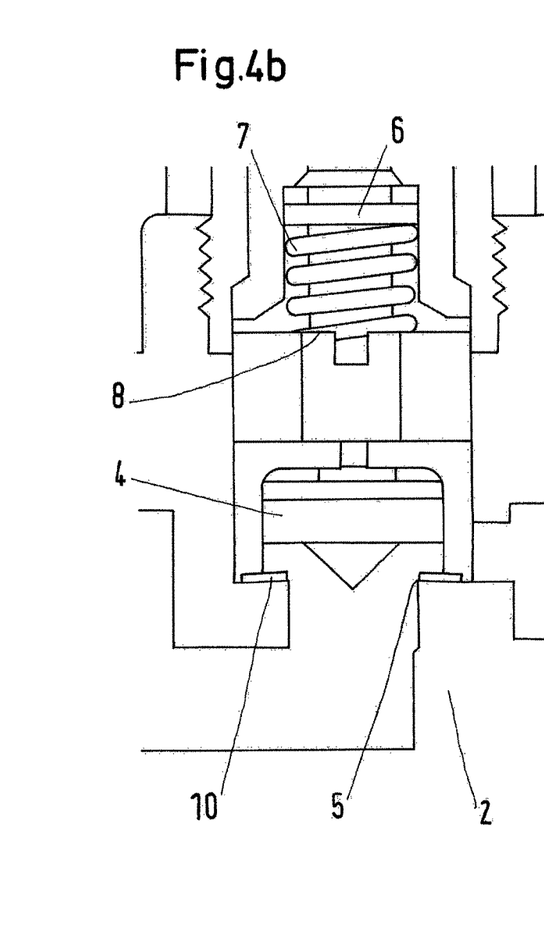
FIG. 4b show a valve according to a fourth embodiment of the invention.

In another embodiment of the invention making use of the idea to influence the effective length of the valve element 4 depending on the temperature of the fluid, the temperature sensitive means 10 are arranged on the valve seat 5. In this case, at fluid temperature below a certain temperature, for example 55° C., the valve 2 may be throttled down by the temperature sensitive means 10 arranged on the valve seat 5, as shown in FIG. 4*a*. At elevated fluid temperatures, for example above 55° C., as shown in FIG. 4*b*, the temperature sensitive means 10 may upthrottle the fluid flow in the valve 2 by increasing a flow cross section. This can for example happen by increasing a distance between the valve element 4 and the temperature sensitive means 10, for example by having a shift of a shape of the temperature sensitive means 10 from a tilted low temperature shape to a flat high temperature shape. Thus, while a distortion of the temperature detection by the temperature depending actuating means 9 may be possible at elevated fluid temperatures, by providing an increased flow cross section in the valve, for example by using a bi-metal element as temperature sensitive means 10, an increased flow may be maintained over an extended period of time in order to allow a good heating of the ambient temperature up to a desired value.

Figure 8:
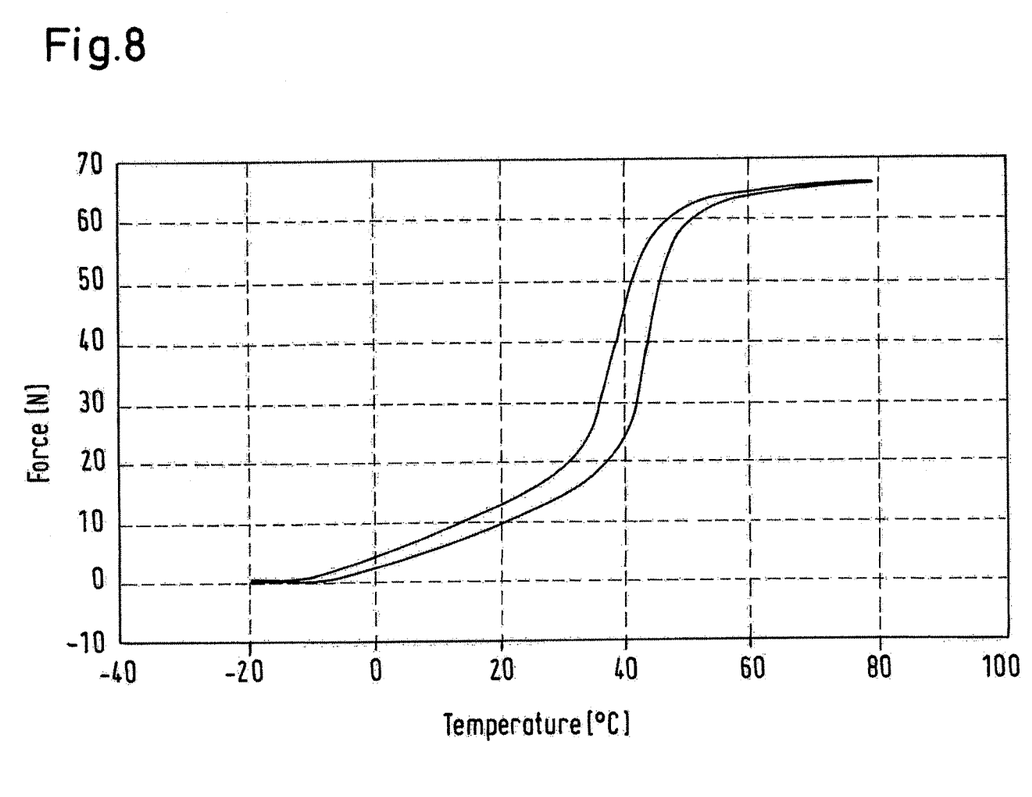
FIG. 8 shows an exemplary dependency between a fluid temperature and a force exerted by the temperature sensitive means in an exemplary embodiment of the invention.

Finally, FIG. 8 gives an exemplary dependence between fluid temperature in ° C. and force in N for exemplary temperature sensitive means 10. The dependence shows a hysteresis. The lower branch of the hysteresis cycle corresponds to an increase of temperature while the upper branch corresponds to a decrease of temperature. According to the diagram the temperature sensitive means 10 provide a first force in a first temperature range, in this case from approximately −20° C. to approximately 40° C., and a second force different from the first force in a second temperature range, in this case between 40° C. and about 80° C. It should be noted that, in this case, the first force is not constant over the first temperature range but actually is a force range from ON to approximately 20 N. Also, the second force in this case is not constant in the second temperature range but is actually a force range between approximately 40 N to approximately 70 N. At approximately 40° C. a transition from the first force to the second force occurs so in this case a transition from the first force range to the second force range. Transition in this case means a jump in the exerted force. Thus, the first force is smaller than the second force and at a certain temperature the temperature sensitive means 10 may, for example, jump from a first resetting force to a second resetting force counteracting the actuating force of the temperature depending actuating means 9 in the thermostat head 3. However, it should be understood that in certain embodiments the first force or force range has a larger force than the second force or force range. As shown in FIG. 8 the second force is approximately constant from 72° C. on and above.

In an embodiment not shown, a thermostat head 3 is provided with a temperature sensitive means 10 influencing a throttling behavior of said valve 2 depending on a temperature of the fluid controlled by said valve 2. The thermostat head 3 comprises a temperature depending actuating means 9 for actuating a valve 2 depending on an ambient temperature of a thermostat head 3. When the fluid controlled by said valve 2 surpasses a certain temperature, for example 55° C., the fluid temperature may distort the detection of the ambient temperature, thus resulting in a premature downthrottling of the valve 2 as the temperature depending actuating means 9 will downthrottle the valve 2 before the ambient temperature actually reaches the desired value. Then the temperature sensitive means 10 present in the thermostat head 3 can provide, for example, a counterforce against the actuating force provided by the temperature depending actuating means 9. It shall be understood that the invention described in view of the valve 2 thus can also be implemented in the thermostat head 3 in a convenient manner, for example when in the thermostat head 3 the temperature sensitive means 10 are configured to influence the effective length of the valve element 4 of the valve 2 depending on the temperature of the fluid or the temperature sensitive means 10 are configured to influence the force actuating the valve element 4 depending on the temperature of the fluid.

Concerning the heat exchanger thermostat 1, it may be advantageous to have the valve 2 and the thermostat head 3 form an integrated unit. Thus, the thermostat head 3 may not get lost. For example, in an embodiment not shown, the thermostat head 3 and the valve 2 are coupled via an unitary valve rod 6 which prevents detachment of the thermostat head 3 from the valve 2. In the present embodiments though the valve 2 an the thermostat head 3 are separate parts. Thus, the valve rod 6 has engagement means adapted to cooperate with complementary engagement means in the thermostat head 3, in order to allow disconnecting the thermostat head 3 from the valve 2.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A valve for a heat exchanger thermostat, the valve comprising:
    an inlet;
    an outlet;
    a valve seat between said inlet and said outlet;
    a valve element cooperating with said valve seat and being actuable by a valve rod that is actuable by a temperature depending actuating means configured to provide an actuating force depending on an ambient temperature; and
    a temperature sensitive means provided on or within said valve, the temperature sensitive means influencing a throttling behavior of said valve depending on a temperature of a fluid controlled by said valve;
    wherein the temperature sensitive means are configured to provide a counterforce to the actuating force on the valve element depending on a temperature of the fluid; and
    wherein the temperature sensitive means provide a first force at a first temperature and a second force at a second temperature, the first force being lower than the second force and the first temperature being lower than the second temperature.

2. The valve according to claim 1, wherein the temperature sensitive means are configured to influence an effective length of the valve element depending on the temperature of the fluid.

3. The valve according to claim 1, wherein the temperature sensitive means are arranged within the valve element.

4. The valve according to claim 1, wherein the temperature sensitive means are interposed between the valve element and the valve rod.

5. The valve according to claim 1, wherein the temperature sensitive means are arranged on the valve seat.

6. The valve according to claim 1, wherein the temperature sensitive means are interposed between a resilient resetting means for the valve element and a resetting means seat.

7. The valve according to claim 1, wherein the temperature sensitive means form a resilient resetting means for the valve element.

8. The valve according to claim 1, wherein the temperature sensitive means comprise a shape memory alloy and/or a bi-metal.

9. The valve according to claim 1, wherein the temperature sensitive means comprise a distancing disc and/or a coil spring.

10. The valve according to claim 1, wherein the temperature sensitive means provide a first force in a first temperature range and a second force different from the first force in a second temperature range, a transition from the first force to the second force occurring at a temperature of the fluid of between 40° C. and 90° C.

11. A thermostat head for a heat exchanger thermostat, the thermostat head comprising:
a temperature depending actuating means for actuating a valve element with an actuating force depending on an ambient temperature of the thermostat head; and
a temperature sensitive means provided on or within said thermostat head, the temperature sensitive means influencing a throttling behavior of said valve depending on a temperature of a fluid being controlled by said valve;
wherein the temperature sensitive means are configured to provide a counterforce to the actuating force on the valve element depending on a temperature of the fluid; and
wherein the temperature sensitive means provide a first force at a first temperature and a second force at a second temperature, the first force being lower than the second force and the first temperature being lower than the second temperature.

12. A heat exchanger thermostat comprising a valve and a thermostat head, the valve comprising:
an inlet;
an outlet;
a valve seat between said inlet and said outlet;
a valve element cooperating with said valve seat and being actuable by a valve rod with an actuating force; and
the thermostat head comprising temperature depending actuating means for actuating a valve depending on an ambient temperature of the thermostat head; and
temperature sensitive means provided on or within said valve and/or said thermostat head, the temperature sensitive means influencing a throttling behavior of said valve depending on a temperature of a fluid controlled by said valve;
wherein the temperature sensitive means are configured to provide a counterforce to the actuating force on the valve element depending on a temperature of the fluid; and
wherein the temperature sensitive means provide a first force at a first temperature and a second force at a second temperature, the first force being lower than the second force and the first temperature being lower than the second temperature.

13. The heat exchanger thermostat according to claim 12, wherein the valve and the thermostat head form an integrated unit.

14. The valve according to claim 2, wherein the temperature sensitive means are arranged within the valve element.

15. The valve according to claim 2, wherein the temperature sensitive means are interposed between the valve element and the valve rod.

16. The valve according to claim 3, wherein the temperature sensitive means are interposed between the valve element and the valve rod.

17. The valve according to claim 2, wherein the temperature sensitive means are arranged on the valve seat.

18. The valve according to claim 3, wherein the temperature sensitive means are arranged on the valve seat.

19. The valve according to claim 1, wherein the temperature dependent actuating means is configured to provide the actuating force depending on the temperature of the fluid.

20. A valve for a heat exchanger thermostat, the valve comprising:
an inlet;
an outlet;
a valve seat between said inlet and said outlet;
a valve element cooperating with said valve seat and being actuable by a valve rod that is actuable by a temperature depending actuating means configured to provide an actuating force depending on an ambient temperature; and
a temperature sensitive means provided on or within said valve, the temperature sensitive means influencing a throttling behavior of said valve depending on a temperature of a fluid controlled by said valve;
wherein the temperature sensitive means are configured to provide a counterforce to the actuating force on the valve element depending on a temperature of the fluid; and
wherein the temperature sensitive means are arranged on the valve seat.

21. A valve for a heat exchanger thermostat, the valve comprising:
an inlet;
an outlet;
a valve seat between said inlet and said outlet;
a valve element cooperating with said valve seat and being actuable by a valve rod that is actuable by a temperature depending actuating means configured to provide an actuating force depending on an ambient temperature; and
a temperature sensitive means provided on or within said valve, the temperature sensitive means influencing a throttling behavior of said valve depending on a temperature of a fluid controlled by said valve;
wherein the temperature sensitive means are configured to provide a counterforce to the actuating force on the valve element depending on a temperature of the fluid; and
wherein the temperature sensitive means provide a first force in a first temperature range and a second force different from the first force in a second temperature range, a transition from the first force to the second force occurring at a temperature of the fluid of between 40° C. and 90° C.

22. A valve for a heat exchanger thermostat, the valve comprising:
an inlet;
an outlet;
a valve seat between said inlet and said outlet;
a valve element cooperating with said valve seat and being actuable by a valve rod that is actuable by a temperature depending actuating means configured to provide an actuating force depending on an ambient temperature; and a temperature sensitive means provided on or within said valve, the temperature sensitive means influencing a throttling behavior of said valve depending on a temperature of a fluid controlled by said valve;

wherein the temperature sensitive means are configured to provide a counterforce to the actuating force on the valve element depending on a temperature of the fluid; and wherein the temperature dependent actuating means is configured to provide the actuating force depending on the temperature of the fluid.

* * * * *